United States Patent
Bitar et al.

(10) Patent No.: US 8,583,886 B2
(45) Date of Patent: Nov. 12, 2013

(54) SYNCHRONIZING DATA STORAGE SYSTEMS IN A DATA STORAGE ENVIRONMENT

(75) Inventors: Akram Bitar, Haifa (IL); Irit Dolev, Haifa (IL); Shachar Fienblit, Haifa (IL); Olympia Gluck, Haifa (IL); Gilad Sharaby, Haifa (IL); Gail Spear, Tucson, AZ (US); Aviad Zlotnick, Haifa (IL)

(73) Assignee: International Business Machines Corporation, Armonk, NY (US)

(*) Notice: Subject to any disclaimer, the term of this patent is extended or adjusted under 35 U.S.C. 154(b) by 563 days.

(21) Appl. No.: 12/698,331

(22) Filed: Feb. 2, 2010

(65) Prior Publication Data

US 2011/0191557 A1    Aug. 4, 2011

(51) Int. Cl.
*G06F 12/00* (2006.01)
(52) U.S. Cl.
USPC ............. 711/162; 711/E12.103; 711/154
(58) Field of Classification Search
USPC ................... 711/162, 154, E12.103
See application file for complete search history.

(56) References Cited

U.S. PATENT DOCUMENTS 5,742,792 A * 4/1998 Yanai et al. .............. 711/162
6,574,709 B1 * 6/2003 Skazinski et al. ........ 711/119
2007/0150676 A1 * 6/2007 Arimilli et al. .......... 711/162
2007/0226437 A1   9/2007 McClure
2007/0300037 A1 * 12/2007 Rogers et al. ............ 711/202

OTHER PUBLICATIONS

Christophe Bertrand et al., "Hitachi Universal Replicator Software Architecture Overview", Hitachi Data Systems, Nov. 2008.
Troxell, "Migrating from IBM XRC to Hitachi Universal Replicator", Bank of America, Aug. 13, 2008.

* cited by examiner

*Primary Examiner* — Larry Mackall
(74) *Attorney, Agent, or Firm* — Griffiths & Seaton PLLC (57) ABSTRACT

A method for synchronizing data storage systems is provided. The method comprises designating a relationship between a first data storage system and a second data storage system, such that data stored in the first data storage system is copied to the second data storage system, in response to determining that the data stored in the first data storage system has been modified; receiving a first request to modify data stored in a first data block of a first storage volume in the first data storage system, wherein the data block is modified according to the first request; determining that the first data block has not been successfully synchronized when the modified data stored in the first data block is not copied to the second data storage system; and executing a process to retry synchronization of the first data block until synchronization of the first data block is successful, without suspending the relationship while the process is executed.

19 Claims, 7 Drawing Sheets

SYNCHRONIZING DATA STORAGE SYSTEMS IN A DATA STORAGE ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to data storage systems and, more particularly, to synchronization of data storage systems in a data storage environment.

BACKGROUND

A backup relationship may be established between a primary data storage system and a secondary data storage system to support redundant storage of data in case there is a need to recover lost data. Once the backup relationship is established, the primary data storage system is synchronized with the secondary data storage system such that data written to the primary data storage system is copied to the secondary data storage system. A data inconsistency may occur if data is accessed from the primary data storage system after being modified in the primary data storage system but before being modified in the secondary data storage system.

For example, suppose that the value A is written to location X in the primary data storage system; synchronization of location X fails; the value A is read from location X; a function of the value A is computed and the result (i.e., value B) is written to location Y in the primary data storage system; and synchronization of location Y succeeds. In such a scenario, data stored in the secondary data storage system is inconsistent. That is, the value B stored in location Y in the secondary data storage system is not the result of computing a function of the value A stored in location X in the secondary data storage system.

SUMMARY

The present disclosure is directed to systems and corresponding methods that facilitate synchronization of data storage systems in a data storage environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for synchronizing data storage systems is provided. The method comprises designating a relationship between a first data storage system and a second data storage system, such that data stored in the first data storage system is copied to the second data storage system, in response to determining that the data stored in the first data storage system has been modified; receiving a first request to modify data stored in a first data block of a first storage volume in the first data storage system, wherein the data block is modified according to the first request; determining that the first data block has not been successfully synchronized when the modified data stored in the first data block is not copied to the second data storage system; and executing a process to retry synchronization of the first data block until synchronization of the first data block is successful, without suspending the relationship while the process is executed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

As provided earlier, a backup relationship may be established between a primary data storage system and a secondary data storage system to support redundant storage of data in case there is a need to recover lost data. Once the backup relationship is established, the primary data storage system is synchronized with the secondary data storage system such that data written to the primary data storage system is copied to the secondary data storage system.

If synchronization is unsuccessful, data consistency may be preserved by suspending the backup relationship. Unfortunately, suspending the backup relationship may prevent lost data from being recovered. Also, re-synchronization of the primary data storage system 110 and the secondary data storage system may take a long time if the backup relationship is subsequently re-established.

Systems and methods are provided below for preserving data consistency in a data storage environment without suspending a backup relationship between a primary data storage system and a secondary data storage system in the data storage environment.

Figure 1:
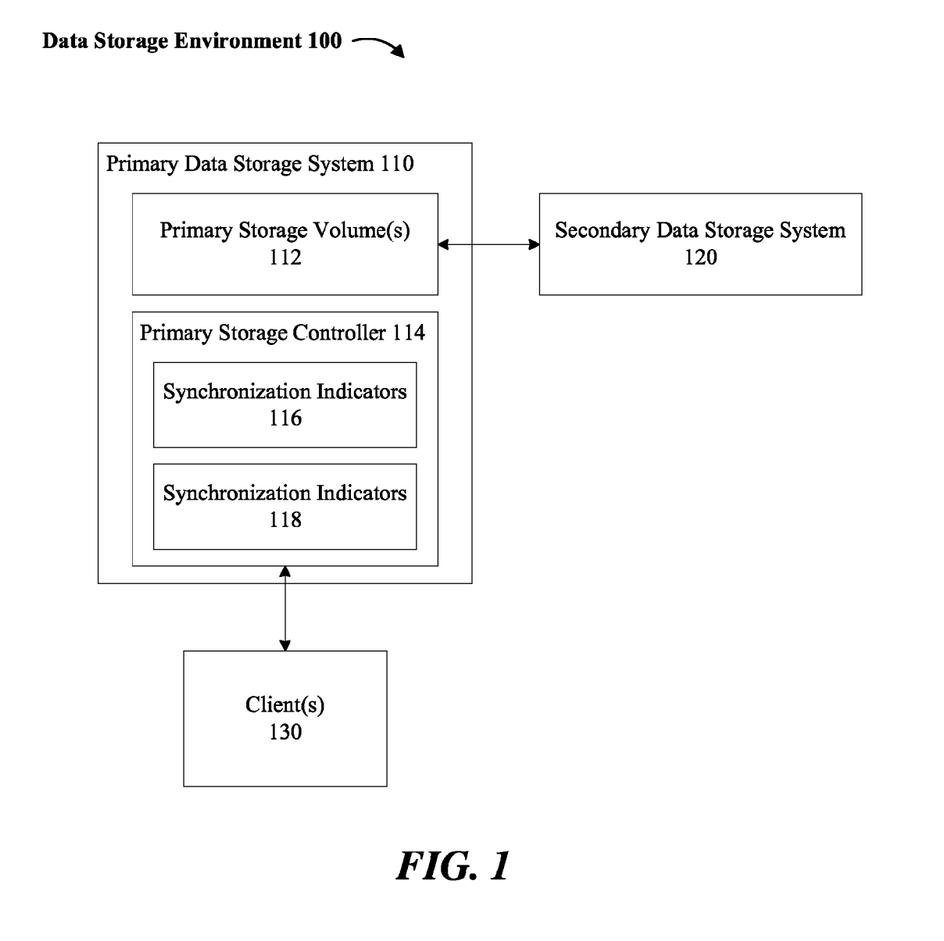
FIG. 1 illustrates an exemplary data storage environment, in accordance with one or more embodiments.

Referring to FIG. 1, in accordance with one or more embodiments, an exemplary data storage network 100 comprises a primary data storage system 110, a secondary data storage system 120, and one or more clients 130. The primary data storage system 110 comprises one or more primary storage volumes 112 and a primary storage controller 114.

The primary storage controller 114 may manage read and write requests received from the clients 130. If a backup relationship is established between the primary data storage system 110 and the secondary data storage system 120, the primary data storage system 110 and the secondary data storage system 120 may be synchronized such that data stored in a data block of a primary storage volume 112 is copied to a data block of the secondary data storage system 120 upon being modified due a write request.

It is noteworthy that the above data block implementation is exemplary in nature. Other types of data chunks (e.g., extents) may be utilized to implement the same or similar data storage schemes. Accordingly, the exemplary embodiments disclosed here should not be construed as limiting the scope of the claimed subject matter to a data block implementation or other specific implementations.

Synchronization indicators 116 may be utilized by the primary storage controller 114 to identify out-of-synch (OOS) data blocks. An OOS data block refers to a data block of a primary storage volume 112 for which synchronization was unsuccessful. Data blocks may become out-of-synch due to a communication error, unavailability of the secondary data storage system 120, or other condition that prevents data stored in the primary data storage system 110 from being successfully copied to the secondary data storage system 120.

In addition to the synchronization indicators 116, another set of synchronization indicators 118 may be utilized by the primary storage controller 114 to identify OOS storage volumes. An OOS storage volume refers to a primary storage volume 112 that has at least one OOS data block. In other words, the synchronization indicators 116 are utilized to identify OOS data at the block level, and the synchronization indicators 114 identify OOS data at the volume level.

In one embodiment, the synchronization indicators 116 may be implemented as one or more bitmaps. If there are X data blocks in a primary storage volume 112, X bits in a bitmap may be respectively associated with each data block of the primary storage volume 112, such that each bit (i.e., synchronization indicator 116) is associated with data block on the primary storage volume 112. Depending on implementation, a set value (e.g., 1) may be assigned to a synchronization indicator 116 to indicate that an associated data block is an OOS data block. A reset value (e.g. 0) may be assigned to a synchronization indicator 116 to indicate that an associated data block is a synchronized data block.

In one embodiment, the synchronization indicators 118 may be implemented as one or more bitmaps. If there are X primary storage volumes 112 in the primary data storage system 110, X bits in a bitmap may be respectively associated with each of the primary storage volumes 112, such that each bit (i.e., synchronization indicator 118) is associated with a primary storage volume 112. Depending on implementation, a set value (e.g., 1) may be assigned to a synchronization indicator 118 to indicate that an associated primary storage volume 112 is an OOS storage volume. A reset value (e.g., 0) may be assigned to a synchronization indicator 118 to indicate that an associated primary storage volume 112 is a synchronized storage volume.

It is noteworthy that the above exemplary bitmap and value associations for setting or resetting the bits are exemplary in nature. Other types of data structures (e.g., linked lists, arrays, tables, B-Trees, etc.) and value setting mechanisms may be utilized to implement the same or similar indexing, mapping, or tracking schemes. Accordingly, the exemplary embodiments disclosed here should not be construed as limiting the scope of the claimed subject matter to bitmaps or other specific examples.

Also, depending on implementation, the synchronization indicators 116, 118 may be stored in volatile memory, non-volatile memory, or a combination thereof. Volatile memory refers to memory that requires a power supply to retain stored information. Examples of volatile memory include most forms of random access memory (RAM) such as dynamic RAM and static RAM. Non-volatile memory refers to memory that does not require a power supply to retain stored information. Examples of non-volatile memory include read-only memory, flash memory, optical disk drives, and most types of magnetic computer storage devices such as hard disks, floppy disks, and magnetic tape.

Figure 2A:
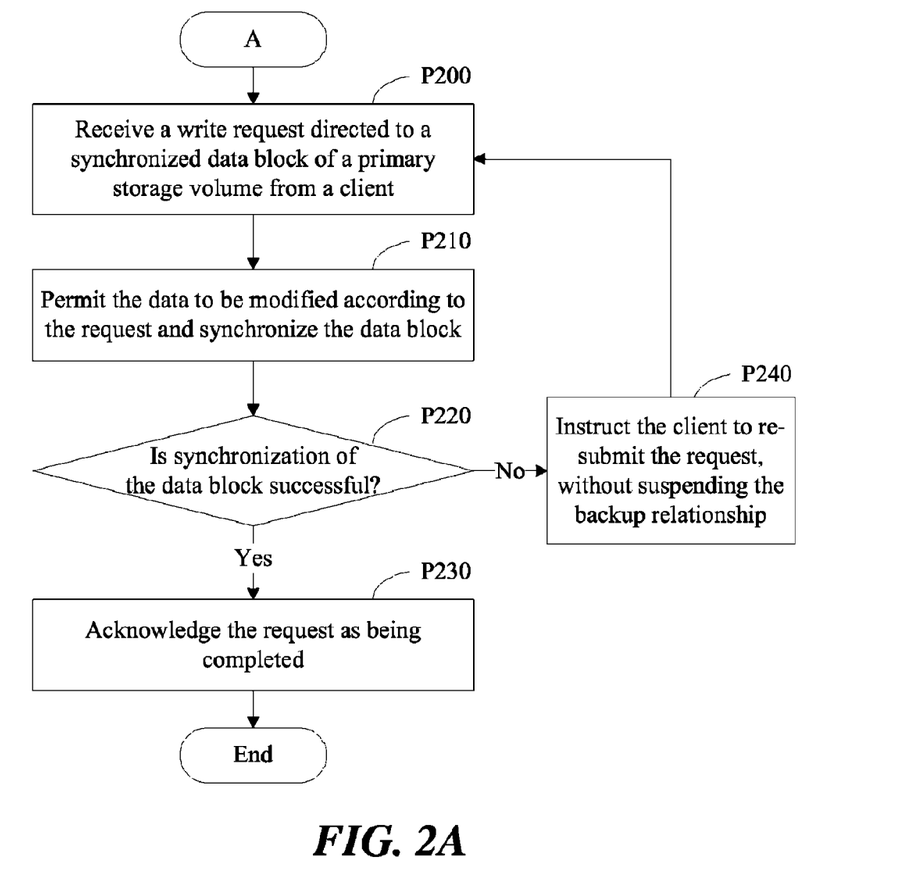
FIGS. 2A and 2B are flow diagrams of a method for managing a write request directed to a synchronized data block, in accordance with one embodiment.

Referring to FIGS. 1 and 2A, in accordance with one embodiment, a backup relationship may be established between the primary data storage system 110 and the secondary data storage system 120. Once the backup relationship is established, the primary storage controller 114 may receive a request to modify data stored in a synchronized data block of a primary storage volume 112 (i.e., a write request) from a client 130 (P200)

Upon receiving the request, the primary storage controller 114 permits the data to be modified according to the request and synchronizes the data block (P210). The primary storage controller 114 may utilize a synchronization indicator 116 associated with the data block to identify the data block as a synchronized data block (e.g., by determining that a respective bit is assigned a bit value of 0). If synchronization of the data block is successful, the primary storage controller 115 acknowledges the request as being completed (P220, 230). Otherwise, the primary storage controller 114 instructs the client 130 to re-submit the request, without suspending the backup relationship (P240).

Figure 2B:
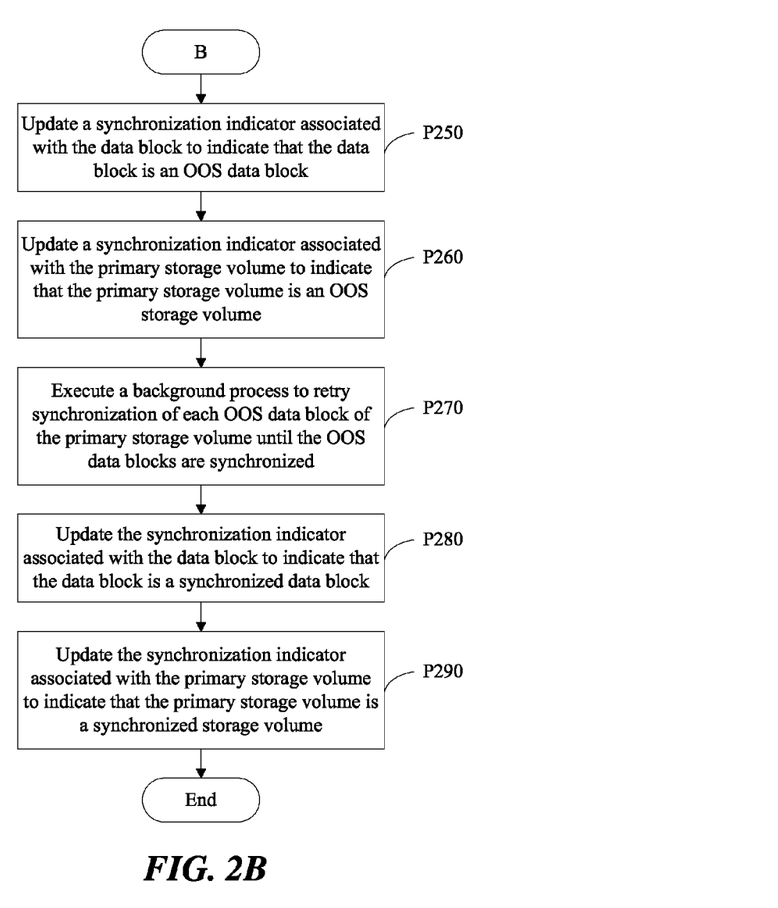

Referring to FIGS. 1, 2A, and 2B, in accordance with one embodiment, the primary storage controller 114 may perform one or more processes while waiting for the client 130 to re-submit the request. The primary storage controller 114 updates the synchronization indicator 116 associated with the data block to indicate that the data block is an OOS data block (e.g., by setting a respective bit value to 1) (P250). The primary storage controller 114 also updates a synchronization indicator 118 associated with the primary storage volume 112 to indicate that the primary storage volume 112 is an OOS storage volume (e.g., by setting a respective bit to 1) (P260).

Upon updating the synchronization indicators 116 and 118, the primary storage controller 114 executes a background process to retry synchronization of each OOS data block of the primary storage volume 112 until the OOS data blocks are synchronized (P270). It is noteworthy that the background process may shorten the time required to synchronize an OOS data block by synchronizing the data block before a client 130 retries a request to modify data stored in the data block.

Once synchronization of the data block is successful, the primary storage controller 114 updates the synchronization indicator 116 associated with the data block to indicate that the data block is a synchronized data block (e.g., by resetting a respective bit to 0) (P280). Once synchronization of each data block of the primary storage volume 112 is successful, the primary storage controller 114 updates the synchronization indicator 118 associated with the primary storage volume 112 to indicate that the primary storage volume 112 is a synchronized storage volume (e.g., by resetting a respective bit to 0) (P290).

Figure 3:
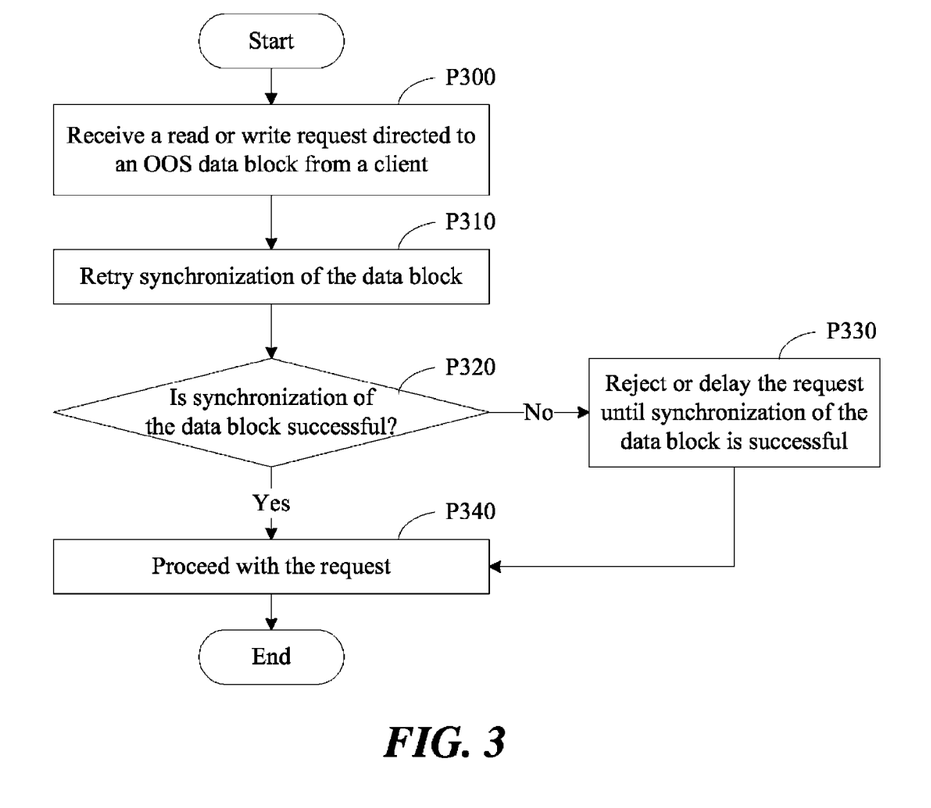
FIG. 3 is a flow diagram of a method for managing a read or write request directed to an out-of-synch (OOS) data block, in accordance with one embodiment.

Referring to FIGS. 1 and 3, in accordance with one embodiment, a backup relationship may be established between the primary data storage system 110 and the secondary data storage system 120. Upon receiving a request to access data stored in an OOS data block of a primary storage volume 112 (i.e., a read or write request) from a client 130, the primary storage controller 114 retries synchronization of the data block (P300, P310). The primary storage controller 114 may utilize a synchronization indicator 116 associated with the data block to identify the data block as an OOS data block (e.g., by determining that a respective bit is assigned a bit value of 1).

If synchronization of the data block is unsuccessful, the primary storage controller 114 rejects or delays the request until synchronization of the data block is successful (P320, P330). Once synchronization of the data block is successful, the primary storage controller 114 proceeds with the request (P340). The primary storage controller 114 may also update the synchronization indicator 116 to indicate that the data block is a synchronized data block (e.g., by resetting a respective bit to 0) and update a synchronization indicator 118 associated with the primary storage volume 112 to indicate that the primary storage volume 112 is a synchronized storage volume (e.g., by resetting a respective bit to 0).

Figure 4:
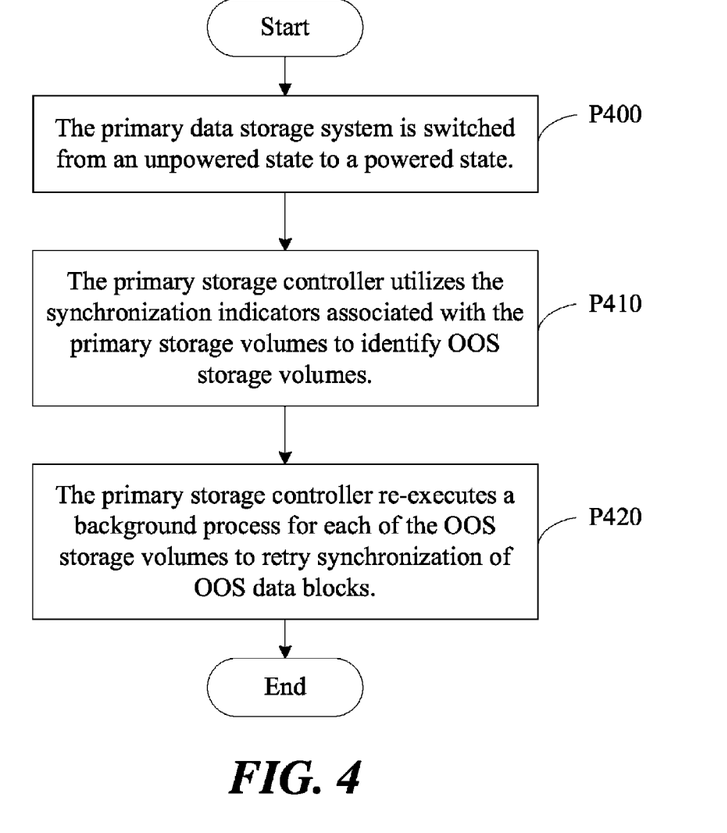
FIG. 4 is a flow diagram of a method for initializing a data storage system when the data storage system switches from an unpowered state to a powered state, in accordance with one embodiment.

Referring to FIGS. 1 and 4, in accordance with one embodiment, the primary data storage system 110 may switch from an unpowered state to a powered state (P400). During initialization, the primary storage controller 114 utilizes the synchronization indicators 118 to identify OOS storage volumes (e.g., by determining that respective bits are assigned a bit value of 1) (P 410).

Upon identifying the OOS storage volumes, the primary storage controller 114 re-executes a background process for each of the OOS storage volumes to retry synchronization of OOS data blocks (P420). In such an embodiment, the synchronization indicators 118 are stored in non-volatile memory so that the synchronization indicators 118 are retained when the primary data storage system 110 enters an unpowered state.

Advantageously, data consistency is preserved by the above provided processes because modified data is prevented from being accessed until the modified data is copied to the secondary data storage system 120. Also, the time required to successfully synchronize a data block after an unsuccessful synchronization is shortened because synchronization of the data block is retried by a background process or in response to another request directed to the data block.

In different embodiments, the claimed subject matter may be implemented either entirely in the form of hardware or entirely in the form of software, or a combination of both hardware and software elements. For example, the data storage environment 100 may be included in a controlled computing system environment that may be presented largely in terms of hardware components and software code executed to perform processes that achieve the results contemplated by the system of the claimed subject matter.

Figure 5:
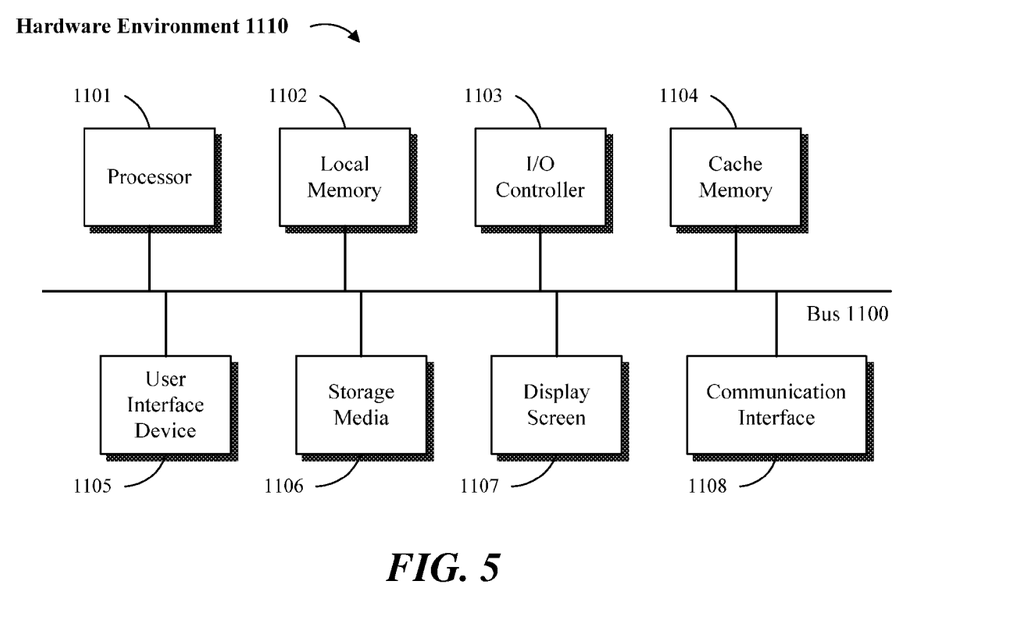
FIGS. 5 and 6 are block diagrams of hardware and software environments in which a system of the claimed subject matter may operate, in accordance with one or more embodiments.
Figure 6:
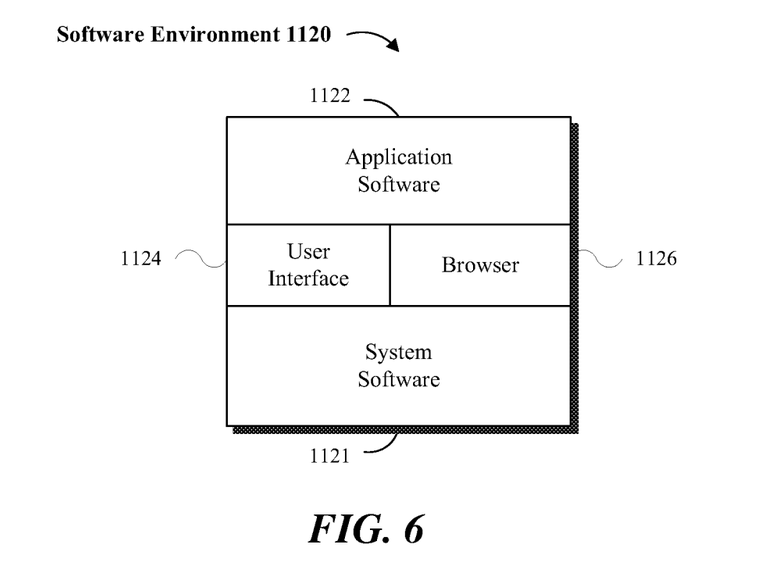

Referring to FIGS. 5 and 6, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the data manager 130 may be implemented as system software 1121 or application software 1122 executed on one or more hardware environments to facilitate synchronization of data storage systems in a data storage environment.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 5, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A computer-implemented method for synchronizing data storage systems, the method comprising:
   designating a relationship between a first data storage system and a second data storage system, such that data stored in the first data storage system is copied to the second data storage system, in response to determining that the data stored in the first data storage system has been modified;
   receiving a first request to modify data stored in a first data block of a first storage volume in the first data storage system, wherein the data block is modified according to the first request;
   determining that the first data block has not been successfully synchronized when the modified data stored in the first data block is not copied to the second data storage system;
   executing a process to retry synchronization of the first data block until synchronization of the first data block is successful, wherein the relationship is not suspended while the process is executed and the process retries synchronization of the first data block without waiting for the first request to be re-submitted;
   receiving a second request to read the modified data stored in the first data block; and
   rejecting or delaying the second request to read the modified data stored in the first data block until synchronization of the first data block is successful.

2. The method of claim 1, further comprising retrying synchronization of the first data block, in response to receiving the second request.

3. The method of claim 1, further comprising updating a first synchronization indicator to indicate that the first data block is an out-of-synch (OOS) data block.

4. The method of claim 3, further comprising updating a second synchronization indicator to indicate that the first storage volume is an OOS storage volume.

5. The method of claim 4, further comprising updating the first synchronization indicator to indicate that the first data block is a synchronized data block, in response to successfully synchronizing the first data block.

6. The method of claim 5, further comprising updating the second synchronization indicator to indicate that the first storage volume is a synchronized storage volume, in response to successfully synchronizing each of the OOS data blocks in the first storage volume.

7. The method of claim 6, wherein the second synchronization indicator is stored in non-volatile memory.

8. The method of claim 7, further comprising utilizing the second synchronization indicator to identify the first storage volume as an OOS storage volume when the first data storage system switches from an unpowered state to a powered state.

9. The method of claim 8, further comprising re-executing the background process when the first data storage system switches from an unpowered state to a powered state.

10. A system for synchronizing data storage systems, the system comprising:
    a first data storage system;
    a second data storage system in communication with the first data storage system;
    a logic unit for designating a relationship between the first data storage system and the second data storage system, such that data stored in the first data storage system is copied to the second data storage system, in response to determining that the data stored in the first data storage system has been modified;

a logic unit for receiving a first request to modify data stored in a first data block of a first storage volume in the first data storage system, wherein the data block is modified according to the first request;

a logic unit for determining that the first data block has not been successfully synchronized when the modified data stored in the first data block is not copied to the second data storage system;

a logic unit for executing a process to retry synchronization of the first data block until synchronization of the first data block is successful, wherein the relationship is not suspended while the process is executed and the process retries synchronization of the first data block without waiting for the first request to be re-submitted;

a logic unit for receiving a second request to read the modified data stored in the first data block; and a logic unit for rejecting or delaying the second request to read the modified data stored in the first data block until synchronization of the first data block is successful.

11. The system of claim 10, further comprising a logic unit for retrying synchronization of the first data block, in response to receiving the second request.

12. The system of claim 10, further comprising a logic unit for updating a first synchronization indicator to indicate that the first data block is an out-of-synch (OOS) data block.

13. The system of claim 12, further comprising a logic unit for updating a second synchronization indicator to indicate that the first storage volume is an OOS storage volume.

14. The system of claim 13, further comprising a logic unit for updating the first synchronization indicator to indicate that the first data block is a synchronized data block, in response to successfully synchronizing the first data block.

15. The system of claim 14, further comprising a logic unit for updating the second synchronization indicator to indicate that the first storage volume is a synchronized storage volume, in response to successfully synchronizing each of the OOS data blocks in the first storage volume.

16. The system of claim 15, wherein the second synchronization indicator is stored in non-volatile memory.

17. The system of claim 16, further comprising a logic unit for utilizing the second synchronization indicator to identify the first storage volume as an OOS storage volume when the first data storage system switches from an unpowered state to a powered state.

18. The system of claim 17, further comprising a logic unit for re-executing the background process when the first data storage system switches from an unpowered state to a powered state.

19. A computer program product comprising a non-transitory computer readable medium having logic code stored thereon, wherein the logic code when executed on a computer causes the computer to:

designate a relationship between a first data storage system and a second data storage system, such that data stored in the first data storage system is copied to the second data storage system, in response to determining that the data stored in the first data storage system has been modified;

receive a first request to modify data stored in a first data block of a first storage volume in the first data storage system, wherein the data block is modified according to the first request;

determine that the first data block has not been successfully synchronized when the modified data stored in the first data block is not copied to the second data storage system;

execute a process to retry synchronization of the first data block until synchronization of the first data block is successful, wherein the relationship is not suspended while the process is executed and synchronization of the first data block is retried without waiting for the first request to be re-submitted;

receive a second request to read the modified data stored in the first data block; and reject or delay the second request to read the modified data stored in the first data block until synchronization of the first data block is successful.

\* \* \* \* \*